United States Patent [19]

Carlson

[11] 4,141,819

[45] Feb. 27, 1979

[54] PROCESS FOR TREATING A SOUR PETROLEUM DISTILLATE

[75] Inventor: David H. J. Carlson, Park Ridge, Ill.

[73] Assignee: UOP Inc., Des Plaines, Ill.

[21] Appl. No.: 868,367

[22] Filed: Jan. 10, 1978

Related U.S. Application Data

[63] Continuation-in-part of Ser. No. 760,295, Jan. 18, 1977, Pat. No. 4,087,378.

[51] Int. Cl.² .............................................. C10G 27/06
[52] U.S. Cl. .................................................. 208/206
[58] Field of Search ............................... 208/206, 207; 252/431 N

[56] References Cited

U.S. PATENT DOCUMENTS

| | | | |
|---|---|---|---|
| 2,882,224 | 4/1959 | Gleim et al. | 208/206 |
| 3,260,665 | 7/1966 | Urban | 208/206 |
| 3,408,287 | 10/1968 | Urban et al. | 208/206 |
| 4,070,307 | 1/1978 | Carlson | 252/431 N |
| 4,087,378 | 5/1978 | Carlson | 252/431 N |

*Primary Examiner*—George Crasanakis
*Attorney, Agent, or Firm*—James R. Hoatson, Jr.; Robert W. Welch; William H. Page, II

[57] ABSTRACT

A process for treating a mercaptan-containing sour petroleum distillate is disclosed. The process comprises contacting said distillate with a supported metal phthalocyanine catalyst in the presence of an alkaline reagent at oxidation conditions, said catalyst having been prepared by impregnating a solid adsorptive support with a common alcoholic solution of a metal phthalocyanine and a carboxylic acid.

11 Claims, No Drawings

PROCESS FOR TREATING A SOUR PETROLEUM DISTILLATE

CROSS-REFERENCE TO RELATED APPLICATIONS

This application is a continuation-in-part of a copending application Ser. No. 760,295 filed Jan. 18, 1977, now U.S. Pat. No. 4,087,378, May 2, 1978.

Processes for the treatment of sour petroleum distillates wherein the distillate is passed in contact with a supported metal phthalocyanine catalyst have become well known and widely practiced in the petroleum refining industry. The treating process is typically designed to effect the catalytic oxidation of the offensive mercaptans contained in the sour petroleum distillate, thereby converting said mercaptans to innocuous disulfides—a process commonly referred to as sweetening. The oxidizing agent is most often air which is admixed with the distillate to be treated, and the alkaline reagent is most often an aqueous caustic solution charged continuously to the process, or intermittently as required. Gasoline, including natural, straight run and cracked gasoline, is one of the most frequently treated petroleum distillates. Others include the normally gaseous petroleum fractions as well as naphtha, kerosenes, jet fuel, lube oil, and the like.

In the preparation of a supported metal phthalocyanine catalyst, it is the practice to adsorb the metal phthalocyanine on an adsorptive support from a solution and/or dispersion thereof. Alcoholic solutions and/or dispersions have heretofore provided a most active catalytic composite, and said alcoholic solutions and/or dispersions are commonly employed in the preparation and regeneration of supported metal phthalocyanine catalysts used throughout the industry in the sweetening of sour petroleum distillates.

It has now been found that when said metal phthalocyanine is adsorbed on said support from a common alcoholic solution of said metal phthalocyanine and a carboxylic acid, a catalytic composite of improved activity is produced. Thus, the present invention embodies a process for treating a mercaptan-containing sour petroleum distillate which comprises contacting said distillate with a supported metal phthalocyanine catalyst in the presence of an alkaline reagent at oxidation conditions, said catalyst having been prepared by impregnating a solid adsorptive support with a common alcoholic solution of a metal phthalocyanine and a carboxylic acid containing up to about 10 carbon atoms in a weight ratio of acid to phthalocyanine of from about 1.5:1 to about 15:1, and thereafter drying the resulting catalytic composite.

Another embodiment is in a process which comprises treating said distillate in contact with a supported metal phthalocyanine catalyst in the presence of an aqueous alkali metal hydroxide solution and air, said catalyst having been prepared by impregnating an activated charcoal support with a common methanolic solution of a cobalt phthalocyanine monosulfonate and an aliphatic monobasic carboxylic acid containing up to about 10 carbon atoms in a weight ratio of acid to phthalocyanine of from about 1.5:1 to about 15:1.

One of the preferred embodiments of this invention relates to a process for treating a mercaptan-containing sour petroleum distillate which comprises contacting said distillate with a supported metal phthalocyanine catalyst in the presence of an aqueous sodium hydroxide solution and air, said catalyst having been prepared by impregnating an activated charcoal support with a common methanolic solution of acetic acid and a cobalt phthalocyanine monosulfonate in a weight ratio of from about 1.5:1, and thereafter drying the resulting catalytic composite.

Other objects and embodiments will become apparent in the following detailed specification.

The solid adsorbent supports herein contemplated include the various and well-known solid adsorbent materials in general use as catalyst supports. Preferred adsorbent materials include the various charcoals produced by the destructive distillation of wood, peat, lignite, nut shells, bones, and other carbonaceous matter, and preferably such charcoals as have been heat treated, or chemically treated, or both, to form a highly porous particle structure of increased adsorbent capacity, and generally defined as activated charcoal. Said adsorbent materials also include the naturally occurring clays and silicates, for example, diatomaceous earth, fullers earth, kieselguhr, attapulgus clay, feldspar, montmorillonite, haloysite, kaolin, and the like, and also the naturally occurring or synthetically prepared refractory inorganic oxides such as alumina, silica, zirconia, thoria, boria, etc., or combinations thereof, like silica-alumina, silica zirconia, alumina-zirconia, etc. Any particular solid adsorbent material is selected with regard to its stability under conditions of its intended use. For example, in the treatment of a sour petroleum distillate, the solid adsorbent material should not only be insoluble in, and otherwise inert to, the petroleum distillate at conditions existing in the treating zone, but also to the aqueous caustic solutions typically admixed with the distillate. Charcoal, and particularly activated charcoal, is preferred because of its capacity for metal phthalocyanine and because of its stability under treating conditions. However, it should be observed that the method of this invention is also applicable to the preparation of a metal phthalocyanine composited with any of the other well-known solid adsorbent materials, particularly the refractory inorganic oxides.

Acetic or ethanoic acid is a particularly preferred carboxylic acid for use in the present invention. Other higher molecular weight carboxylic acids containing up to about 10 carbon atoms or more may be employed to yield a catalytic composite of improved activity although not necessarily of the same degree as experienced in the use of the readily available and relatively inexpensive acetic acid. The selected carboxylic acid may be a dibasic acid, for example oxalic acid, however, monobasic carboxylic acids are preferred. Suitable carboxylic acids include the aliphatic monobasic carboxylic acids, and particularly the saturated aliphatic monobasic carboxylic acids such as n-propanoic acid, 2-methylpropanoic acid, n-butanoic acid, 3-methylbutanoic acid, 2-methylbutanoic acid, n-pentanoic acid, 4-methylpentanoic acid, n-hexanoic acid, n-heptanoic acid, and the like. In any case, the carboxylic acid is preferably employed in a weight ratio of from about 1.5:1 to about 15:1 with the metal phthalocyanine.

The catalytic composite of this invention may comprise any of the various metal phthalocyanines heretofore disclosed as useful to catalyze the sweetening process, for example, magnesium, titanium, hafnium, vanadium, tantalum, molybdenum, manganese, iron, cobalt, nickel platinum, palladium, copper, silver, zinc and tin phthalocyanine, and the like. Cobalt phthalocyanine and vanadium phthalocyanine are particularly preferred metal phthalocyanines. The metal phthalocyanine is preferably employed herein as a derivative thereof, the commercially available sulfonated derivatives, for example, cobalt phthalocyanine monosulfonate, cobalt phthalocyanine disulfonate, or mixtures thereof, being particularly preferred. The sulfonated derivatives may be prepared, for example, by reacting cobalt, vanadium, or other metal phthalocyanine with fuming sulfuric acid. While the sulfonated derivatives are preferred, it is understood that other derivatives, particularly the carboxylic derivatives, may be employed. The carboxylated derivatives are readily prepared by reacting the metal phthalocyanine with phosgene in the presence of aluminum chloride. In the latter reaction, the acid chloride is formed and may be converted to the desired carboxylated derivative by conventional hydrolysis.

The common alcoholic solution herein contemplated may comprise one or more of those alcohols in general use as a solvent, for example, methanol, ethanol, n-propanol, isopropanol, n-butanol, sec-butanol, isobutanol, n-pentanol, and the like. The relatively inexpensive and abundant methanol is an entirely suitable solvent and is most often used in the preparation of supported metal phthalocyanine catalysts.

The adsorbent support can be impregnated with the metal phthalocyanine-carboxylic acid alcoholic solution in any conventional or otherwise convenient manner. In general, the support in the form of spheres, pills, pellets, granules, or other particles of uniform or irregular shape, is dipped, soaked, suspended, or otherwise immersed in the described alcoholic solution, or the alcoholic solution may be sprayed onto, poured over, or otherwise contacted with the adsorbent support. In any case, the excess solution is separated and the resulting composite allowed to dry under ambient temperature conditions, or dried at an elevated temperature in an oven, or in a flow of hot gases, or in any other suitable manner.

It is generally preferable to adsorb as much metal phthalocyanine on the adsorbent support as will form a stable catalytic composite—generally up to about 25 wt. %, although a lesser amount in the range of from about 0.1 to about 10 wt. % affords a suitably active catalytic composite. One suitable and convenient method comprises predisposing the solid support in a distillate treating zone or chamber as a fixed bed, and passing the alcoholic metal phthalocyanine-carboxylic acid solution through the bed in order to form the catalytic composite in situ. This method allows the alcoholic solution to be recycled one or more times to achieve a desired concentration of the metal phthalocyanine on the adsorbent support. In still another method, the adsorbent support may be predisposed in said treating chamber and the chamber thereafter filled with the alcoholic metal phthalocyanine-carboxylic acid solution to soak the support for a predetermined period, thereby forming the catalytic composite in situ.

In the sweetening process herein contemplated, offensive mercaptans contained in a sour petroleum distillate are oxidized to form innocuous disulfides in the presence of an alkaline reagent. The catalytic composite is typically initially saturated with the alkaline reagent, and the alkaline reagent thereafter admixed, at least intermittently, with the sour petroleum distillate passed in contact with the catalytic composite to maintain a desired alkaline reagent concentration thereon. While any suitable alkaline reagent may be employed, an alkali metal hydroxide in aqueous solution, for example, an aqueous solution of sodium hydroxide, potassium hydroxide, etc., is most often preferred. The solution may further comprise a solubilizer to promote mercaptan solubility, for example alcohol, and especially methanol, ethanol, n-propanol, isopropanol, etc., and also phenols, cresols, and the like. A particularly preferred alkaline reagent is a caustic solution comprising from about 2 to about 30 wt. % sodium hydroxide. The solubilizer, when employed, is preferably methanol, and the alkaline solution may suitably comprise from about 2 to about 100 volume % thereof. While sodium hydroxide and potassium hydroxide constitute the preferred alkaline reagents, others including lithium hydroxide, rubidium hydroxide and cesium hydroxide, are also suitably employed.

The sweetening process is usually effected at ambient temperature conditions, although elevated temperatures not in excess of about 150° C. may be used. The process may be effected at a pressure of up to about 1000 psig., or more, although atmospheric, or substantially atmospheric, pressures are entirely suitable. Contact times equivalent to a liquid hourly space velocity of from about 1 to about 100 or more are effective to achieve a desired reduction in the mercaptan content of a sour petroleum distillate, an optimum contact time being dependent on the size of the treating zone, the quantity of catalyst contained therein and the sour petroleum distillates being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing agents may be employed. The mixture of petroleum distillate, alkaline reagent and oxidizing agent is passed upwardly or downwardly through the catalyst bed. In some cases, the air may be passed countercurrent to the petroleum distillate. In still other cases, the petroleum distillate and alkaline reagent may be introduced separately into the treating zone.

In many cases, the sour petroleum distillate and especially gasoline, is first treated with an alkaline reagent solution in order to extract a major portion of the mercaptan prior to further treating in the manner herein described. Any suitable alkaline reagent, and particularly sodium hydroxide or potassium hydroxide in aqueous solution, is utilized. This removes a major portion of the mercaptans but leaves a distillate which is still sour. Further conversion of the mercaptans is effected in the presence of the catalytic composite herein described.

The catalytic composite prepared in accordance with the method of this invention is both active and stable. Accordingly, the catalytic composite may be employed in a fixed bed for the treatment of large volumes of sour petroleum distillate. Although the metal phthalocyanine is somewhat soluble in alkaline solution, it is nevertheless retained on the solid adsorbent support. However, in the event that any of the metal phthalocyanine is leached from the support, or otherwise carried away in the alkaline solution, it may be readily recycled in said solution for reuse in the sweetening process. However, it is in some cases desirable to introduce additional metal phthalocyanine for adsorption on the solid support in the manner herein described.

The following examples are presented in illustration of certain preferred embodiments of this invention and are not intended as an undue limitation on the generally broad scope of the invention as set out in the appended claims.

EXAMPLE I

In the preparation of a supported metal phthalocyanine catalyst in accordance with the method of this invention, activated adsorptive charcoal particles were impregnated with a common methanolic solution of cobalt phthalocyanine monosulfonate and acetic acid. The impregnating solution was prepared by admixing a 150 mg of cobalt phthalocyanine monosulfonate with a solution of 0.5 ml of glacial acetic acid in 3 ml of methanol. The resulting dispersion-solution was stirred for about 5 minutes and then diluted to about 125 ml with methanol. About 100 cc of the charcoal particles, having a particle size in the 10 × 30 mesh range, were then immersed in the impregnating solution. The solution was stirred in contact with the particles for about 5 minutes, and then maintained in contact with the particles under quiescent conditions for about 1 hour. The impregnating solution was thereafter evaporated to dryness in contact with the particles over a steam bath, and the impregnated particles subsequently oven-dried at about 100° C. for 1 hour. The catalytic composite of this example is hereinafter referred to as Catalyst A.

EXAMPLE II

A catalytic composite was prepared substantially as described in the previous example except that the carboxylic acid was omitted from the formulation. The catalytic composite of this example is hereinafter referred to as Catalyst B.

Catalyst A of Example I was subjected to a comparative evaluation test relative to Catalyst B of Example II. The test was effected in an air atmosphere at ambient conditions of temperature and pressure. In each case, 13.3 cc of catalyst, 100 cc of a sour kerosene and 5 cc of aqueous sodium hydroxide (pH 14) were contained in a closed glass vessel inserted in a shaking device. The reaction mixture was shaken in contact with the catalyst for about a 30 minute period after which the kerosene was analyzed for residual mercaptan sulfur. The results are tabulated below.

| Time, min. | Mercaptan Sulfur, ppm | |
|---|---|---|
| | Catalyst A | Catalyst B |
| 0 | 164 | 164 |
| 30 | 9 | 8 |

Catalyst A of Example I was further subjected to the described comparative evaluation test relative to Catalyst B of Example II utilizing a sour kerosene of substantially higher mercaptan sulfur content. The test results were as follows:

| Time, min. | Mercaptan Sulfur, ppm | |
|---|---|---|
| | Catalyst A | Catalyst B |
| 0 | 407 | 407 |
| 30 | 6 | 19 |

Utilizing a sour kerosene of still higher mercaptan sulfur content, Catalyst A of Example I was again subjected to the described comparative evaluation test relative to Catalyst B of Example II. In this instance, the test results were as follows:

| Time, min. | Mercaptan Sulfur, ppm | |
|---|---|---|
| | Catalyst A | Catalyst B |
| 0 | 930 | 930 |
| 120 | 11 | 21 |

The catalytic composite prepared in accordance with the method of this invention exhibits a significant activity improvement with respect to the conversion of mercaptans contained in a sour kerosene distillate, particularly with respect to the conversion of mercaptan contained in those kerosene fractions of higher mercaptan content, as demonstrated by the above comparative examples.

I claim as my invention:

1. A process for treating a mercaptan-containing sour petroleum distillate which comprises contacting said distillate with a supported metal phthalocyanine catalyst in the presence of an alkaline reagent at oxidation conditions, said catalyst having been prepared by impregnating a solid adsorptive support with a common alcoholic solution of a metal phthalocyanine and a carboxylic acid containing up to about 10 carbon atoms in a weight ratio of acid to phthalocyanine of from about 1.5:1 to about 15:1, and thereafter drying the resulting catalytic composite.

2. The process of claim 1 further characterized in that said adsorptive support is an activated charcoal.

3. The process of claim 1 further characterized in that said carboxylic acid is an aliphatic monobasic carboxylic acid.

4. The process of claim 1 further characterized in that said carboxylic acid is a saturated aliphatic monobasic carboxylic acid.

5. The process of claim 1 further characterized in that said carboxylic acid is acetic acid.

6. The process of claim 1 further characterized in that said alcoholic solution is a methanolic solution.

7. The process of claim 1 further characterized in that said alcoholic solution is an ethanolic solution.

8. The process of claim 1 further characterized in that said metal phthalocyanine is a cobalt phthalocyanine.

9. The process of claim 1 further characterized in that said metal phthalocyanine is a cobalt phthalocyanine monosulfonate.

10. The process of claim 1 further characterized in that said alkaline reagent is an alkali metal hydroxide in from about a 2 wt. % to about a 30 wt. % aqueous solution.

11. The process of claim 1 further characterized in that said alkaline reagent is sodium hydroxide in from about a 2 wt. % to about a 30 wt. % aqueous solution.

* * * * *